(12) United States Patent
Michalk

(10) Patent No.: US 9,044,925 B2
(45) Date of Patent: Jun. 2, 2015

(54) MULTILAYER THERMOPLASTIC LAMINATED FILM ARRANGEMENT AND DEVICE AND METHOD FOR LAMINATING

(75) Inventor: Manfred Michalk, Erfurt (DE)

(73) Assignee: SMARTRAC IP B.V., Amsterdam (NL)

( * ) Notice: Subject to any disclaimer, the term of this patent is extended or adjusted under 35 U.S.C. 154(b) by 925 days.

(21) Appl. No.: 13/257,436

(22) PCT Filed: Mar. 19, 2010

(86) PCT No.: PCT/EP2010/053639
§ 371 (c)(1),
(2), (4) Date: Dec. 16, 2011

(87) PCT Pub. No.: WO2010/106178
PCT Pub. Date: Sep. 23, 2010

(65) Prior Publication Data
US 2012/0094082 A1    Apr. 19, 2012

(30) Foreign Application Priority Data

Mar. 20, 2009    (DE) .......................... 10 2009 014 249

(51) Int. Cl.
*B32B 37/00*    (2006.01)
*B32B 37/06*    (2006.01)
(Continued)

(52) U.S. Cl.
CPC . *B32B 37/06* (2013.01); *B32B 3/30* (2013.01); *B32B 37/08* (2013.01); *B32B 37/10* (2013.01);
(Continued)

(58) Field of Classification Search
CPC ........ B32B 37/06; B32B 37/08; B30B 15/06; B30B 15/064; B30B 15/34
USPC ............... 156/498, 580, 581, 583.1
See application file for complete search history.

(56) References Cited

U.S. PATENT DOCUMENTS

| 3,029,178 A | 4/1962 | Carver |
| 4,863,546 A | 9/1989 | Melzer et al. |

(Continued)

FOREIGN PATENT DOCUMENTS

| CA | 2554249 A1 | 8/2005 |
| CN | 101060976 A | 10/2007 |

(Continued)

OTHER PUBLICATIONS

International Search Report as mailed on Jun. 30, 2010 for International Application No. PCT/EP2010/053639.

(Continued)

*Primary Examiner* — James Sells
(74) *Attorney, Agent, or Firm* — Quarles & Brady LLP

(57) ABSTRACT

The invention relates to a device (14) for laminating a film-tape-like multilayer thermoplastic film arrangement (1), according to the invention comprising heatable press plates (8.1, 8.2) and cooling surfaces (10), wherein a width of said press plates (8.1, 8.2) and cooling surfaces (10) is greater than or equal to a width of the film arrangement (1), wherein the film arrangement (1) is arranged in the position thereof relative to the press plates (8.1, 8.2) such that press plate edges (20) lie at the grid center (5.1) and the cooling surfaces (10) are arranged with a distance up to 3 mm next to a press plate edge (20) and beginning in the same grid (5), wherein a length of the cooling surfaces (10) is greater than or equal to a length of the press plates (8.1, 8.2), wherein one press plate (8.1, 8.2) and one cooling surface (10) are respectively arranged on both sides of the film arrangement (1), wherein the press plates (8.1, 8.2) are fastened to press plate holding blocks (15) that can be moved or are supported by first press tables (19.1), and wherein the cooling surfaces (10) are part of cooling blocks (16) that can be moved or are supported by second press tables (19.2). The invention further relates to a multilayer thermoplastic laminated film arrangement (1) and to a method for laminating a film-tape-like multilayer thermoplastic film arrangement (1).

8 Claims, 6 Drawing Sheets

Figure 1:
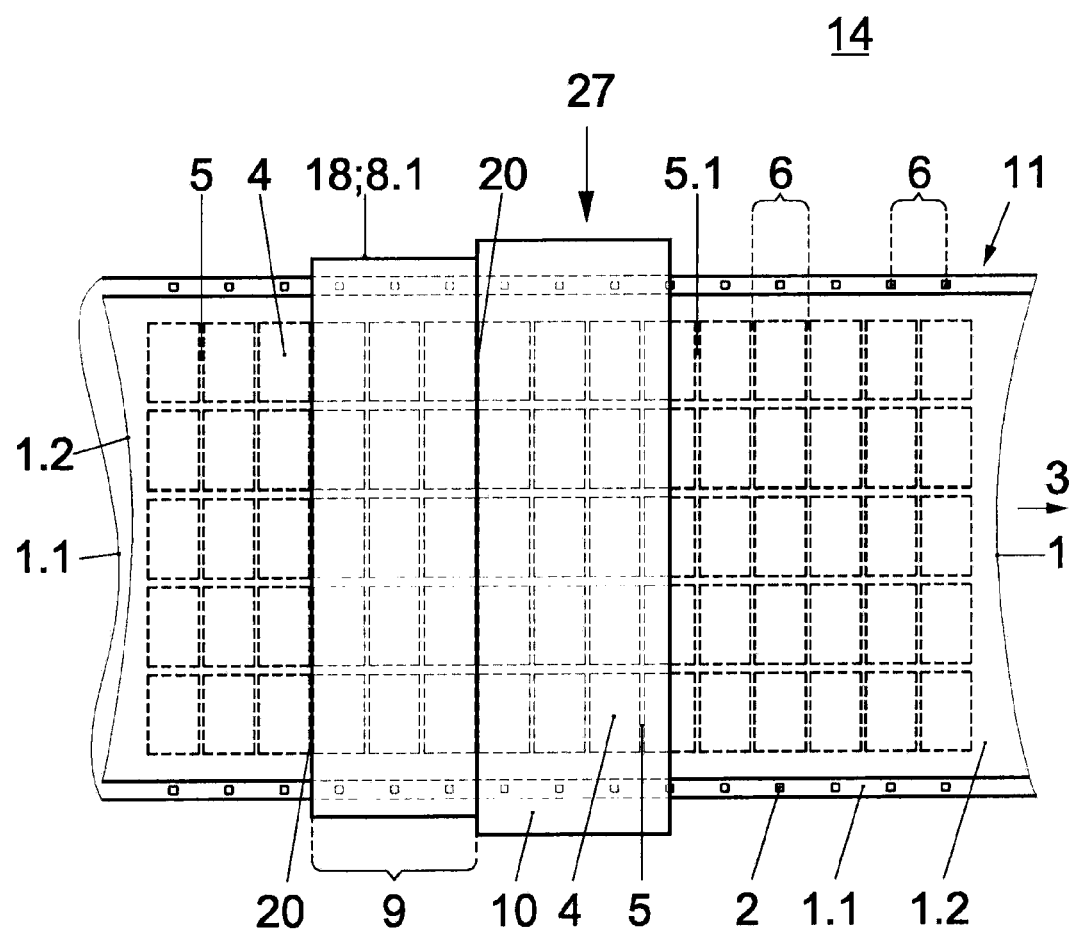

(51) Int. Cl.
 *B32B 3/30* (2006.01)
 *B32B 37/08* (2006.01)
 *B32B 37/10* (2006.01)
 *B32B 38/00* (2006.01)

(52) U.S. Cl.
 CPC ....... *B32B 38/004* (2013.01); *Y10T 428/24612* (2013.01); *B32B 2305/342* (2013.01); *B32B 2305/347* (2013.01); *B32B 2307/736* (2013.01); *B32B 2425/00* (2013.01); *B32B 2519/00* (2013.01)

(56) References Cited

U.S. PATENT DOCUMENTS

| | | | | |
|---|---|---|---|---|
| 5,470,428 A | * | 11/1995 | Sanko | 156/498 |
| 5,472,556 A | * | 12/1995 | Sanko | 156/498 |
| 5,635,014 A | * | 6/1997 | Taylor | 156/358 |
| 5,785,907 A | | 7/1998 | Melzer et al. | |
| 7,612,677 B2 | | 11/2009 | Rietzler | |
| 8,279,070 B2 | | 10/2012 | Rietzler | |
| 2001/0015264 A1 | * | 8/2001 | Stein et al. | 156/581 |
| 2003/0008118 A1 | | 1/2003 | Smulson | |
| 2008/0178989 A1 | | 7/2008 | Ala-Savikota et al. | |

FOREIGN PATENT DOCUMENTS

| | | |
|---|---|---|
| DE | 19543139 A1 | 5/1997 |
| DE | 102004004469 A1 | 8/2005 |
| EP | 0134820 A1 | 3/1985 |
| EP | 1452297 A1 | 9/2004 |
| GB | 745628 | 2/1956 |
| WO | 2005073907 A1 | 8/2005 |

OTHER PUBLICATIONS

State Intellectual Property Office of People's Republic of China, First Office Action, Application No. 2010800221821, Sep. 6, 2013.

* cited by examiner

MULTILAYER THERMOPLASTIC LAMINATED FILM ARRANGEMENT AND DEVICE AND METHOD FOR LAMINATING

CROSS-REFERENCE TO RELATED APPLICATIONS

This application represents the national stage entry of PCT International Application No. PCT/EP2010/053639 filed on Mar. 19, 2010 and claims the benefit of German Patent Application No. DE 10 2009 014 249.5 filed Mar. 20, 2009. The contents of both of these applications are hereby incorporated by reference as if set forth in their entirety herein.

The invention relates to a device for laminating a film-tape-like multi-layer thermoplastic film arrangement according to the features of the preamble of claim 1, a multi-layer thermoplastic laminated film arrangement according to the features of the preamble of claim 9 and a method for laminating a film-tape-like multi-layer thermoplastic film arrangement according to the features of the preamble of claim 10.

The production of smart cards, chip cards and electronic identity cards, in the innermost layers of which antennae, electronic components etc. are mounted, generally proceeds in two production steps: In the first step a pre-laminate, which constitutes a thin, large-area laminate having a plurality of antennae arranged in a special lattice, electronic components etc., is produced from two or more films and following a subsequent first laminating stage.

The pre-laminate is intended essentially to have the appearance and the properties of a single-layer film. The better the quality of the pre-laminate, the better the quality of the finished laminate produced in a second production step. Prior to the second lamination step, additional, usually printed, films are applied on both flat sides of the pre-laminate, with protective films over them. After the second lamination the laminate is separated into individual smart cards, chip cards, identity cards or other formats or products.

In particular, such components as wire antennae with wires of large diameter or with a large number of concentric antenna windings and further electronic components or modules, i.e. semiconductor chips contacted to a substrate material and encased with plastics, with large volume and large thickness in relation to the final card thickness, can adversely affect the quality of the final card if the pre-lamination is inadequate.

In particular in the case of thermoplastic materials, which have a high temperature stability and a softening region which lies in a relatively narrow temperature range, if the pre-lamination is sub-optimal, wires and modules on glossy card surfaces can appear dimly visible after the second lamination. Such a thermoplastic is, for example, polycarbonate (PC), which is used in particular for producing reliable identity cards.

For the pre-lamination and lamination, devices are used which have a high temperature precision in the heating and cooling systems, but which are in general thermally inert. The laminating cycle requires a heating process in which the film arrangement to be laminated is brought up to the required temperature in the softening region and at the same time is pressed together, and a cooling process in which the laminate is cooled down under pressure. Equally as important as the laminating are the leveling and embossing processes, in which wires or conductor paths located on the film surfaces, or components projecting beyond the surface, are pressed flat into one or more films with pressure and heat and subsequent cooling under pressure, or patterns, symbols and/or grooves are embossed into the laminate.

Using state-of-the-art laminators, a plurality of film arrangements which are separated by laminating plates (press plates) and form a film stack, are heated or cooled by heating tables or cooling tables pressing on the stack from above and below. A stack can contain up to 15 laminating plates and up to 70 thin films. In the laminator in turn a plurality of stacks can be laminated at the same time, thus resulting in a high productivity.

A disadvantage is the fact that with its plurality of laminating plates for heating up and cooling down the laminator consumes a large amount of energy, that the heating and cooling processes are slow and that therefore at all times during the laminating each one of the film arrangements located in the stack has a temperature that differs from the neighboring film arrangement and therefore a different softening condition. Thus for example the film arrangement in contact with the heating table is soft, before the film arrangement in the center of the stack has been sufficiently heated. A further disadvantage with these laminators results from the handling of the laminating plates, necessary both to remove the laminates and to place new film arrangements between the laminating plates. Whether done manually or by machine these loading and unloading processes are very laborious.

A further disadvantage in the lamination occurs mainly as a result of the heating of highly shrinkable materials, such as for example PC. Either the cooling of the laminating stack takes place in the heating press while maintaining or increasing the laminating pressure, in order to at least partially counteract the shrinking; in which case the productivity of the laminator is halved and the energy expenditure increases, or else the compression pressure is reduced and the laminating stacks are shifted from the heating press into the cooling press with the result that the hot laminates immediately shrink.

In the case of alternative laminator devices only one film arrangement is located in each case in the heating press or cooling press respectively, and the film arrangement is fed through the laminator as a tape or in a tape-like manner.

One of these alternative laminator devices is designed as a narrow band arrangement. A disadvantage with this device is the fact that the film arrangement is inserted into steel tapes running in parallel on both sides and due to its construction the laminator is not capable of laminating large areas of film or film arrangements with different lattice steps and widths.

In another tape laminator, the film arrangements are passed through the system in release film tapes running in parallel on both sides.

A disadvantage is that the feed advance step results from the largest expected future laminate length in addition to a technically determined distance between the heating and cooling presses, so that when manufacturing small laminate formats, either considerable losses are incurred in terms of thermoplastic film or the film arrangements must first be tacked together, separated into sub-formats and deposited in defined intervals onto the release films.

The problem addressed by the invention is to specify a device and a method for productively and economically laminating film-tape-like multi-layer thermoplastic film arrangements, and a multi-layer thermoplastic laminated film arrangement.

The problem is solved according to the invention by a device for laminating a film-tape-like multi-layer thermoplastic film arrangement with the features of claim 1, a multi-layer thermoplastic laminated film arrangement with the features of claim 9 and a method for laminating a film-tape-like multi-layer thermoplastic film arrangement with the features of claim 10.

Advantageous configurations of the invention are the subject matter of the dependent claims.

A device for laminating a film-tape-like multi-layer thermoplastic film arrangement which is formed from a thermoplastic film-tape or from a plurality of sheet-like film arrangements consecutively arranged in the manner of a film-tape, wherein the film arrangement, at least in the feed direction, has surface portions divided into uniform lattice steps, said surface portions being separated by means of grids, and wherein the lamination takes place with the application of pressure and heating of a laminating section of the film arrangement up to a temperature in the softening region of the thermoplastic and subsequent cooling of the heated laminating section under pressure, according to the invention comprises heatable press plates and cooling surfaces, wherein a width of these press plates and cooling surfaces is greater than or equal to a width of the film arrangement, wherein the film arrangement is arranged in the position thereof relative to the press plates in such a way that press plate edges lie at the grid center and the cooling surfaces are arranged with a distance up to 3 mm next to a press plate edge and beginning in the same grid, wherein a length of the cooling surfaces is greater than or equal to a length of the press plates, wherein one press plate and one cooling surface are respectively arranged on both sides of the film arrangement, wherein the press plates are fastened to press plate holding blocks that can be moved or are supported by first press tables and in each of which one cooling zone is arranged, and wherein the cooling surfaces are part of cooling blocks that can be moved or are supported by second press tables. The cooling blocks are preferably oil-cooled, water-cooled and/or air-cooled. The press tables can preferably be moved by hydraulic, electric and/or pneumatic means. The cooling zones in the press plate holding blocks are advantageously oil-cooled, water-cooled and/or air-cooled. Due to the cooling zones in particular, an improved thermal organization of the press plates can be obtained, which means that the film arrangement can be laminated at optimum temperatures and in an energy-efficient manner.

Due to the cooling zones in the press plate holding blocks the film arrangement can be pressed together and subsequently at least a preliminary cooling of the film arrangement to below a softening point of the thermoplastic material is facilitated, without opening the press plates before an adequate cooling of the film arrangement has taken place. This prevents unwanted shrinkage of the heated film arrangement, which could render it unusable.

Transport of the film arrangement is effected, in contrast to the prior art, without metal tapes or metal plates. This prevents any impediment to heating or cooling energy by the metal tapes or plates, which facilitates the use of very short lamination cycles. Furthermore for each product configuration only one product-specific upper and lower press plate is necessary, with the result that the lamination can take place in a very flexible manner and with very low equipment set-up costs, since when a change of product occurs only the press plates need to be modified.

The term "lamination" also refers to a leveling and embossing of the film arrangement. The device can therefore also be used to press conductor paths and/or electronic components into a substrate and level them off, so that surfaces of the conductor paths and/or of the electronic components are flush with a surface of the substrate. Furthermore, with the device a so-called release film can be applied to one or both sides of the substrate and connected thereto. By means of the device, symbols and/or contours can be embossed into a substrate or a film or a film arrangement.

Press plate holding block pairs and cooling block pairs can be heated or cooled to pre-definable temperatures, and a compression pressure of the press plates and/or the cooling surfaces against one another or onto the film arrangement respectively, and a temporal profile of the said pressure can also preferably be pre-defined. Using the device, film arrangements of large width (up to 650 mm) and different lattice size can be laminated in a stepwise manner. The press plates and the cooling surfaces can be pressed onto the film arrangement by moving them together and can be lifted off the film arrangement by moving them apart. Depending on the intended constructional form of the device, both or only one of the press tables of a pair is/are movable. As an alternative an entire transport plane of the film arrangement is movable perpendicular to a surface of the film arrangement, in order to ensure that only one press table of a press table pair needs to be driven.

A laminating section which has been heated up and subsequently already pre-cooled can be moved very quickly in between the cooling surfaces by the shortest route. The great length of the cooling surfaces ensures complete cooling of the laminate. Since only one press plate or press plate pair must be heated and no press plates or press tapes need to be carried along with the film arrangement, the heating of the film arrangement to a required temperature takes place very rapidly and with low energy expenditure. The cooling also takes place very rapidly, since no energy stores are present apart from the heated film arrangement itself.

Preferably the length of the press plates can be predefined in accordance with a length and number of the grid steps to be laminated in one step, i.e. the press plates on the press plate holding blocks are grid-type specific and easily replaceable. The press plates, with their length from grid center to grid center, ensure a secure lamination of the film arrangement without any overlapping placement of the press plates.

In one advantageous embodiment a heating plate is arranged between the press plate holding block and the press plate. In a further advantageous embodiment a storage plate is arranged between the press plate holding block and the press plate. An insulating layer is preferably arranged between the storage plate and the press plate holding block or between the heating plate and the press plate holding block or between the press plate and the press plate holding block. In this way, both in the case of a directly heated and an indirectly heated press plate an improvement in thermal organization of the press plate can be obtained, which means that the film arrangement can be laminated at optimum temperatures and in an energy-efficient manner.

For this purpose, a thickness and/or a material type of the press plate, the insulating layer and/or the storage plate can be predefined according to a laminating task, and the press plate, the insulating layer and/or the storage plate are replaceable. This means that in the case of heating, a quantity of energy can be predefined in such a way that only a required amount of energy is available only for a given period of time in order to heat boundary surfaces of films to be laminated, with the result that a secure lamination is facilitated. The heating of an inner film, usually a relatively thick core film or a substrate film, to press plate temperature at the time when the press plate is placed on is prevented by the fact that upon placement onto the film arrangement the press plate temperature falls while external film layers are heated.

Suitable choice of the thickness and a specific thermal resistance of the insulating layer on the cooled press plate holding block results in a selective additional cooling of the press plate, and thereby of the laminating section, immediately after heating of the outer films. After completion of a heating cycle the laminating section between the press plates is already cooled in a first cooling phase to temperatures below the softening region of the thermoplastic to be laminated, and after being transported further between the cooling blocks can be further cooled to a desired temperature.

In an advantageous embodiment, a heating plate, which is thermally insulated from the cooling block, is arranged on the cooling block opposite the cooling surface. The cooling blocks can advantageously be moved underneath the press plate holding blocks. In a further advantageous embodiment the press plate holding block is mounted so that it can rotate by 180° about a rotational axis parallel to a surface of the film arrangement and perpendicular to the feed direction, and a press plate is preferably arranged on each of the opposite sides of the press plate holding block, and two cooling zones are advantageously arranged in the press plate holding block. In a further embodiment, heating plates are arranged on the first press tables that press the press plate holding blocks, on a side facing towards the press plate holding blocks. These advantageous embodiments facilitate a temporary indirect heating of the press plate or press plates on external heating plates, by means of which a reduction in the duration and level of energy input into a laminating section can be obtained.

The heating plates of the device are preferably heated electrically and/or by means of a temperature-controlled liquid.

The press plates preferably have a plurality of grid cams arranged in rows transversely to the feed direction, which are aligned towards the film arrangement, wherein a distance between the rows corresponds to a distance of a grid step. Preferably, the grid cams have a width of 0.5 mm to 8 mm and a height of 0.01 mm to 0.4 mm.

The width of the grid cams is substantially less than the width of the grid between the intended surface portions of the film arrangement and the height of the grid cams is less than 10% of a laminate thickness. In the feed direction the length of the press plate begins with a grid cam, additional grid cams are located in each grid center and the end of the press plate is terminated with a grid cam. If both press plates of a press plate pair have grid cams, then it is advantageous if the grid cams are in congruently opposite positions. The grid cams produce groove-like indentations in the laminated film arrangement.

The grid cams as web-like elevations in the press plates and the groove-like indentations in the laminates offer the following advantages: When placing the press plates onto the films of a laminating section, any external films or covering films which are not resting smoothly are tightened, and furthermore simple means can be used to check whether the press plates are arranged exactly opposite one another on the press plate holding blocks and whether the film arrangement is being advanced by exactly one laminating section. If the advance is correct the last grid cam in the tape direction lies exactly in the first groove of the previously laminated laminating section.

In a final lamination process, any air between the pre-laminate and overlaid films can escape better from pre-laminates with a groove. Laminated film arrangements with a groove are better able to be coiled up. If laminates for passports, foldable plastic carts and similar bendable products are to be produced with one or more grooves, possibly up to 8 mm wide and up to 0.4 mm deep, in a region of a future "book spine" (hinge) or a bend, these grooves can also be embossed by appropriate shaping of the web-like elevations in the press plates during the laminating process.

Preferably, the press plates have symbol-like elevations facing towards the film arrangement, preferably with a height of 0.01 mm to 0.3 mm. In this way, symbol-like indentations can be embossed into the film arrangement, which can represent, for example, product identification codes or safety marks.

A plurality of clamping piece pairs is preferably arranged along the film arrangement. By means of these clamping piece pairs, the film arrangement can be held in the transport plane and can be transported in the feed direction by a movement of the clamping piece pairs.

In one advantageous embodiment, a holding tape supply device is arranged before the press plates in the feed direction, and in another advantageous embodiment a holding tape discharge device is arranged after the cooling surfaces in the feed direction.

In order to prevent the laminated film arrangement from sticking to the press plates, it is advantageous to place a thin, temperature-stable holding tape, a so-called release tape, on both sides of the film arrangement and to remove this holding tape after a lamination run by coiling it up.

It can also be advantageous when producing pre-laminates to place a thin, coarse-meshed non-woven fabric made of natural fibers onto the film arrangement on both sides prior to the pre-lamination, as a lost holding tape or release tape.

While it is true that the very thin, coarse-meshed non-woven fabric made of natural fibers with a weight per unit area of less than 10 g/m$^2$ and a fiber length greater than 2 mm and a fiber diameter up to 30 μm is then laminated into the covering films or into external layers of a substrate of the film arrangement, respectively, an adhesive action of the film arrangement onto the press plates is, however, significantly reduced.

A multi-layer thermoplastic laminated film arrangement which is formed from a thermoplastic film-tape or from a plurality of sheet-like film arrangements consecutively arranged in the manner of a film-tape, has surface portions divided into uniform lattice steps at least in the feed direction, said surface portions being separated by means of grids.

According to the invention the film arrangement has groove-like indentations on one or both sides, arranged at the grid centers transversely to a length extension of the film arrangement, wherein the film arrangement has symbol-like indentations on one or both sides and/or wherein for the purposes of stabilization and reduction of wear, on each of the two sides of the film arrangement a very thin and coarse-meshed non-woven fabric tape is completely or almost completely laminated into the film arrangement. The groove-like indentations form for example a hinge or bending point of a foldable card surface. The symbol-like indentations can represent, for example, product identification codes or safety marks.

The non-woven fabric tape, in the form of a lost holding tape or release tape, is placed onto the film arrangement on both sides prior to the pre-lamination as a thin, coarse-meshed non-woven fabric made of natural fibers.

While it is true that the very thin, coarse-meshed non-woven fabric made of natural fibers, for example abaca, with a weight per unit area of less than 10 g/m$^2$ and a fiber length greater than 2 mm and a fiber diameter up to 30 μm is then laminated into the covering films, or into external layers of a substrate of the film arrangement, respectively, an adhesive action of the film arrangement at the press plates during lamination is, however, significantly reduced.

In a method for laminating a film-tape-like multi-layer thermoplastic film arrangement which is formed from a thermoplastic film-tape or from a plurality of sheet-like film arrangements consecutively arranged in the manner of a film-tape, wherein the film arrangement has surface portions divided into uniform lattice steps at least in the feed direction, said surface portions being separated by means of grids, the film arrangement is heated under pressure up to a temperature in the softening region of the thermoplastic and is subsequently cooled under pressure.

According to the invention a laminating section of the film arrangement is heated by means of heated press plates arranged on both sides of the film arrangement and is pressed together, wherein at least one press plate is moved towards the film arrangement and subsequently the press plates are cooled by cooling zones arranged in the press plate holding blocks, wherein the heated laminating section is pressed together by means of the press plates and is at least pre-cooled. Due to the cooling zones in the press plate holding blocks the film arrangement can be pressed together and heated and at least a preliminary cooling of the film arrangement to below a softening point of the thermoplastic material is subsequently facilitated, without opening the press plates before an adequate cooling of the film arrangement has taken place. This prevents unwanted shrinkage of the heated film arrangement, which could render it unusable. The cooling zones arranged in the press plate holding blocks are preferably oil-cooled, water-cooled and/or air-cooled. Transport of the film arrangement is effected, in contrast to the prior art, without metal tapes or metal plates. This prevents any impediment to heating or cooling energy by the metal tapes or plates, which facilitates the use of very short lamination cycles. Furthermore, for each respective product configuration only one product-specific upper and lower press plate is necessary, with the result that the lamination can take place in a very flexible manner and with very low equipment set-up costs, since when a change of product occurs only the press plates need to be modified.

Advantageously, the heated and subsequently already pre-cooled laminating section is pressed together and cooled during the final cooling by means of cooling surfaces arranged on both sides of the film arrangement, wherein at least one cooling surface is moved towards the film arrangement. If the lamination capacity is to be increased, two or three press plate-cooling surface-pair units can be arranged one after another in the feed direction. The length of a feed advance step of the film arrangement increases accordingly to two or three laminating sections. A compression pressure of the press plates and/or the cooling surfaces against one another or onto the film arrangement and a temporal profile of the compression pressure are preferably predefined, i.e. the compression pressure is variable and modifiable during the laminating process so that an optimum compression pressure is always available.

The press plates and the cooling surfaces are heated or cooled to predefined temperatures, and a compression pressure against one another or onto the film arrangement is predefined. The press plates and the cooling surfaces are pressed onto the film arrangement by moving them together and are lifted off the film arrangement by moving them apart.

The film arrangement is heated very rapidly and with low energy expenditure and is then efficiently cooled, whereby damage to the film arrangement between heating and cooling, for example shrinkage, is prevented since the heated and then already pre-cooled laminating section is moved by the shortest route and very quickly between the cooling surfaces.

The film arrangement preferably remains in a transport plane during the laminating process, so that damage to the film arrangements due to, for example, deformations, such as bending of the film arrangement, are precluded.

Preferably, the press plates arranged on press plate holding blocks are pressed onto the film arrangement by means of first press tables that are moveable perpendicular to a surface of the film arrangement and can be driven hydraulically and/or electrically and/or pneumatically, and the cooling surfaces arranged on cooling blocks are preferably pressed onto the film arrangement by means of second press tables that are moveable perpendicular to the surface of the film arrangement and can be driven hydraulically and/or electrically and/or pneumatically, so that a compressive force can be optimally adjusted and an optimum compression of the film arrangement is ensured during the laminating process.

In a preferred embodiment, the film arrangement is held in the transport plane by means of a plurality of clamping piece pairs which are arranged along the film arrangement and by means of a movement of the clamping piece pairs in the feed direction the film arrangement is transported in the feed direction.

The press plates can also be heated up by means of heating plates arranged between the press plates and the press plate holding blocks. In a further advantageous embodiment the press plates are heated up by being temporarily placed onto heating plates arranged on the cooling blocks and/or on the first press tables and are cooled by oil-cooled, water-cooled and/or air-cooled cooling zones arranged in the press plate holding blocks, wherein the cooling of the press plates is preferably temporally delayed by means of insulating layers arranged between the press plate and the press plate holding block, and storage plates preferably arranged between the press plates and the insulating layers in addition to the press plates store a quantity of heat transferred by indirect heating. This facilitates a compression and heating of the film arrangement and subsequently at least a preliminary cooling of the film arrangement.

In an advantageous embodiment, after the heating and compression of the laminating section and a subsequent compression and preliminary cooling by means of the press plates in a first step, the press plates fixed to the press plate holding blocks are moved apart by means of the first press tables, the cooling blocks are displaced opposite to the feed direction towards the heated laminating section and underneath the press plates and by means of the first press tables and the press plate holding blocks and press plates arranged thereon the cooling surfaces are pressed onto the laminating section, wherein the press plates are pressed onto heating plates which are arranged on the cooling blocks opposite to the cooling surface and are heated up. In a second step the press plates fixed to the press plate holding blocks are moved apart once again by means of the first press tables and the cooling blocks, still placed on top of the laminating section like a pair of tongs, are displaced by one laminating section in the feed direction, taking the film arrangement along with them. In this manner, an optimum indirect temporary heating of the press plates, an optimum cooling of the laminating section and an optimum transport of the film arrangement can be achieved.

In a further advantageous embodiment the laminating section is heated by means of the press plates arranged on the press plate holding blocks and pressed together, and is then further pressed together and pre-cooled, wherein the press plate holding blocks each have one press plate on opposite sides, wherein the first press plates are pressed onto the film arrangement and the second press plates facing the press tables and the heating plates arranged thereon are heated up by means of the heating plates. Then both the first press plates and the cooling surfaces are moved apart by means of the first press tables and the second press tables, the press plate holding blocks are each rotated by 180° about a rotational axis parallel to the surface of the film arrangement and perpendicular to the feed direction and the film arrangement is simultaneously moved in the feed direction by one laminating section by means of the clamping piece pairs. After this, the second press plates and the cooling surfaces are again pressed onto the film arrangement.

This results, highly advantageously, in a high productivity of the laminating process with precisely metered heat input into the laminate and a preliminary cooling of the laminate directly following a short heating phase with the lowest possible heating of the core layer of the laminate and with the smallest mechanical loading of the film arrangement. The energy consumption is minimized. When being heated and cooled the film arrangement is always held in the transport plane with low tolerances.

In a further advantageous embodiment the laminating section is heated by means of the press plates arranged on the press plate holding blocks and pressed together, and is then further pressed together and cooled, wherein the press plate holding blocks each have one press plate on opposite sides, wherein the first press plates are pressed onto the film arrangement and the second press plates facing the press tables and the heating plates arranged thereon are heated up by means of the heating plates. The first press plates are then moved apart by means of the first press tables, the press plate holding blocks are each rotated by 180° about a rotational axis parallel to the surface of the film arrangement and perpendicular to the feed direction and the film arrangement is simultaneously moved in the feed direction by one laminating section by means of the clamping piece pairs. The second press plates are then pressed onto the film arrangement again. This embodiment can also be advantageously applied for laminating tacked film sections, for small production volumes and for a test mode.

Before the lamination a thin, temperature-stable holding tape, a so-called release tape, is applied onto the film arrangement on both sides, in order to prevent the laminated film arrangement from sticking to the press plates. This holding tape is removed again after laminating the film arrangement.

It can also be advantageous when producing pre-laminates to place a thin, coarse-meshed non-woven fabric made of natural fibers onto the film arrangement on both sides prior to the pre-lamination, as a lost holding tape or release tape.

While it is true that the very thin, coarse-meshed non-woven fabric made of natural fibers with a weight per unit area of less than 10 g/m$^2$ and a fiber length greater than 2 mm and a fiber diameter up to 30 μm is then laminated into the covering films, or into external layers of a substrate of the film arrangement, respectively, an adhesive action of the film arrangement onto the press plates is, however, significantly reduced.

It is furthermore advantageous, directly during the transport of the laminating section in between the heated press plates to moisten the laminating section on both sides over its entire width using water-wetted air. This produces a lower adhesive action of the films on the press plates and the risk of electrostatic damage to the electronic circuit is reduced.

Exemplary embodiments of the invention are described in more detail below with the aid of drawings.

Figure 2:
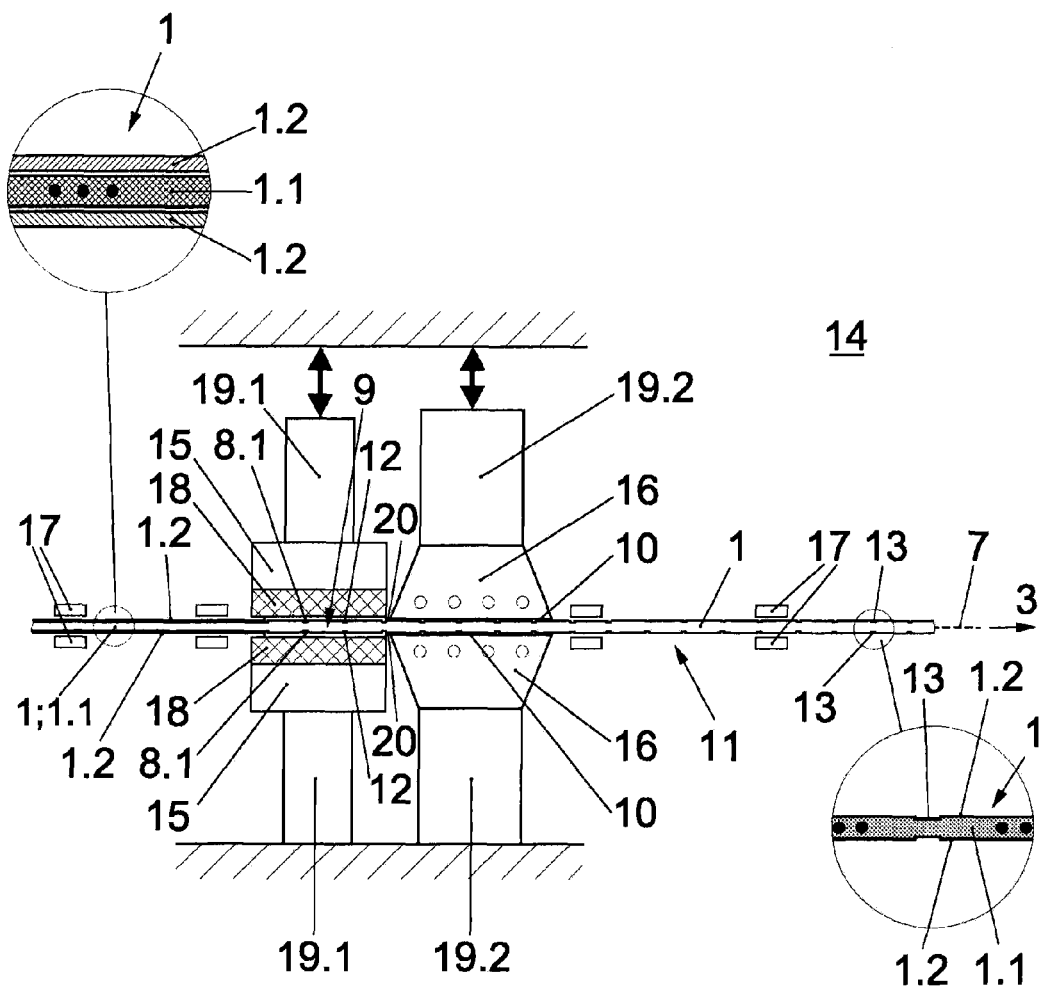
Figure 3:
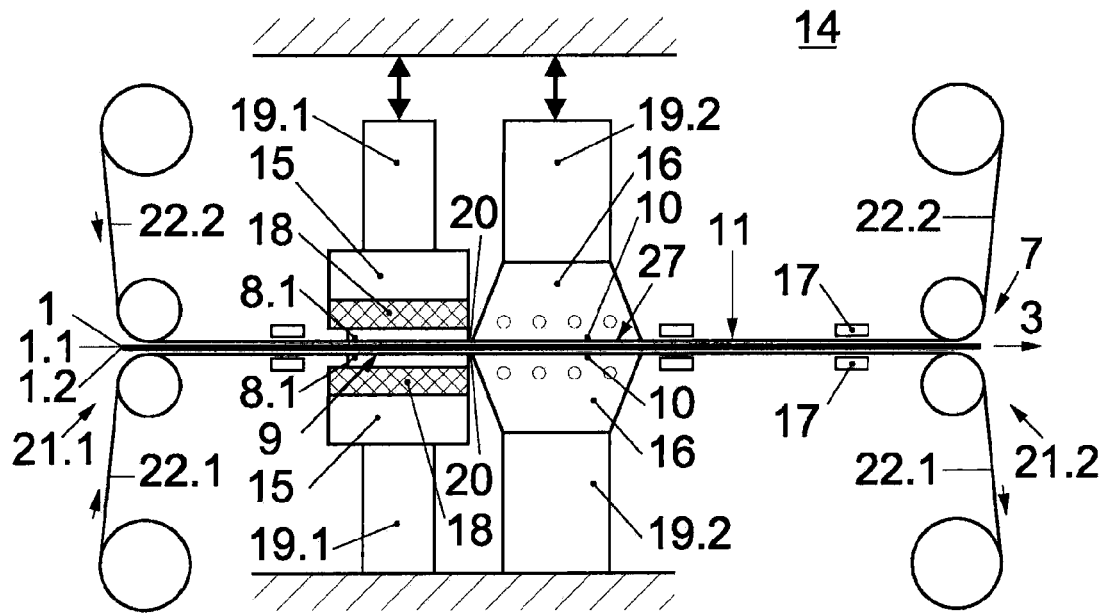
Figure 4:
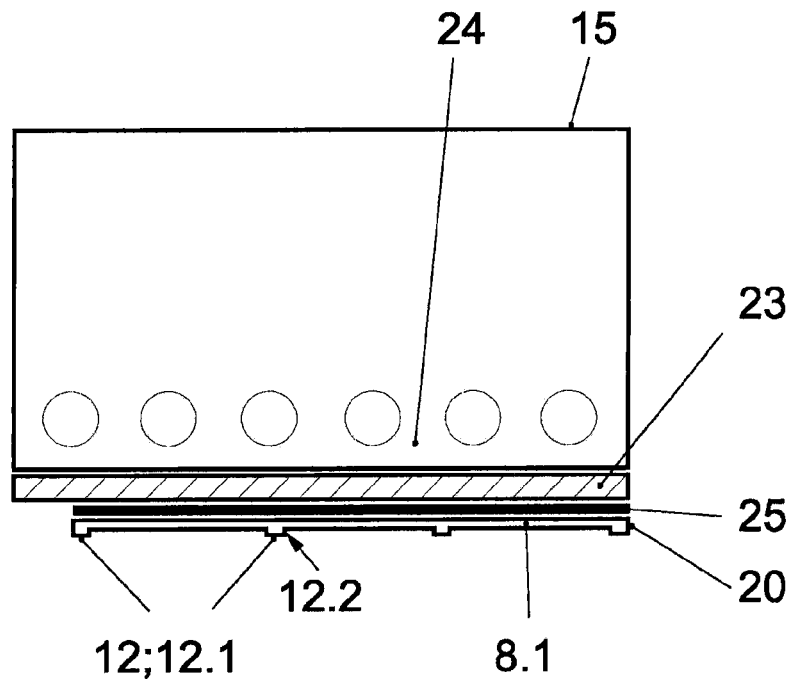
Figure 5A:
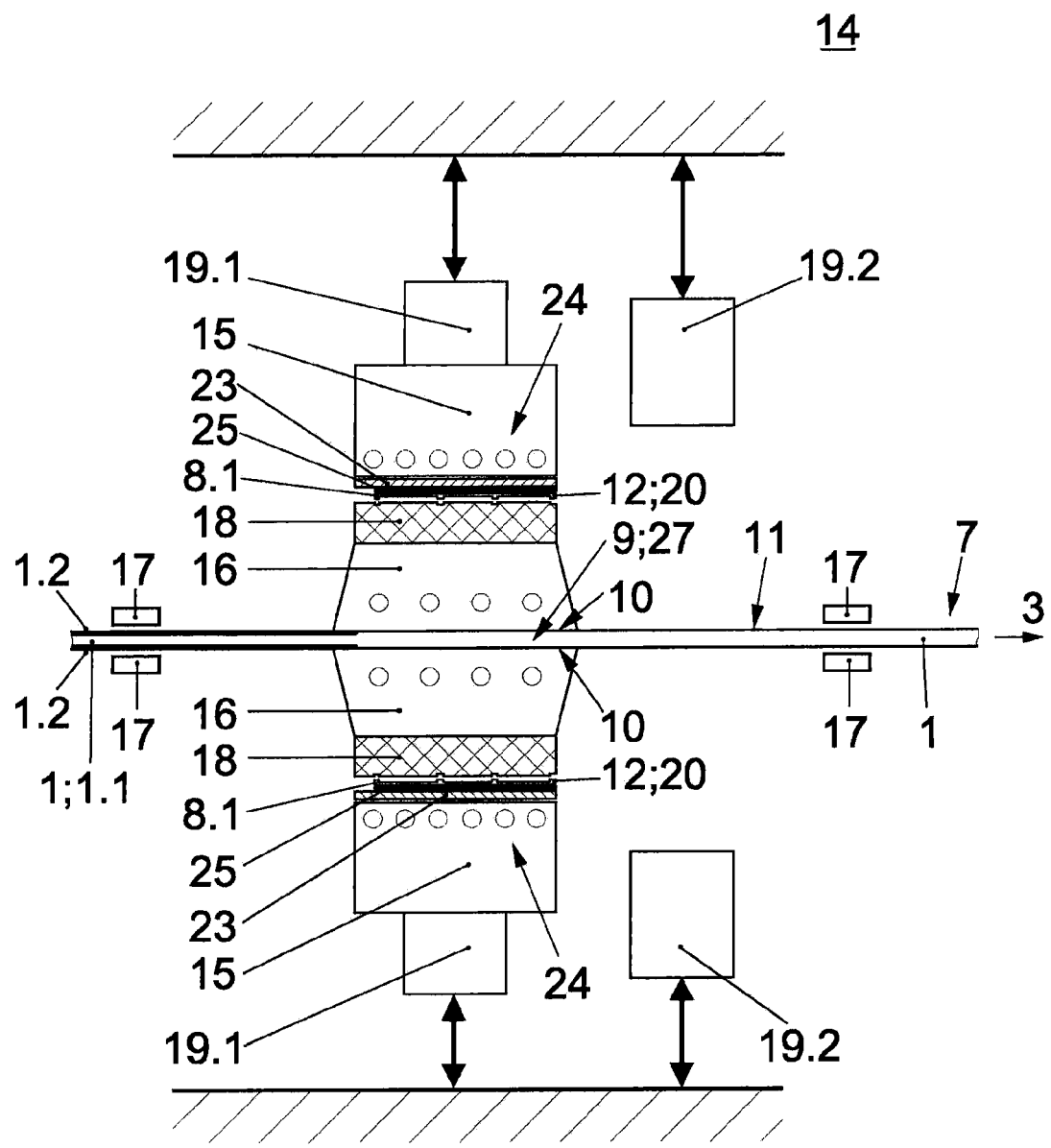
Figure 5B:
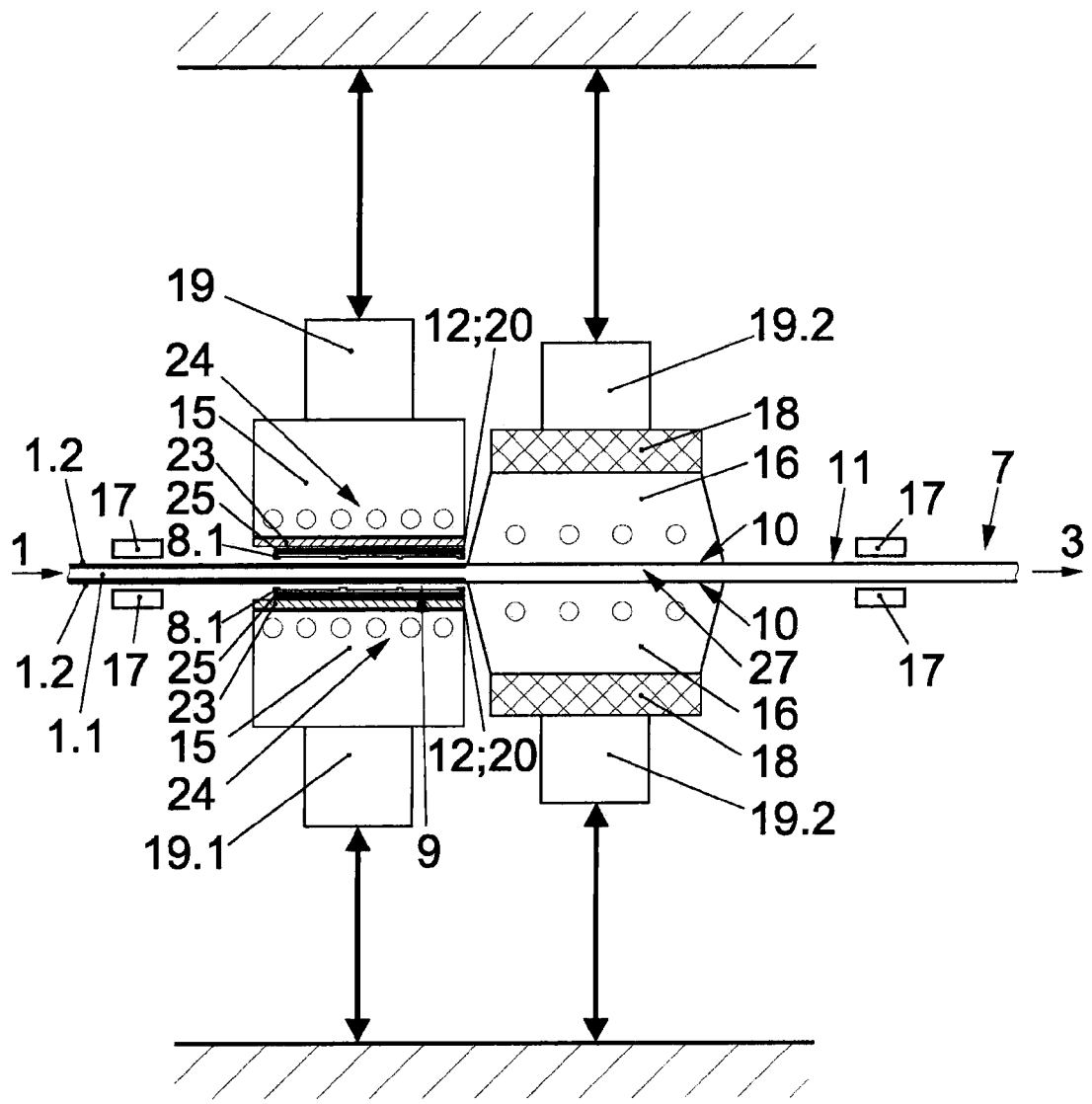
Figure 6:
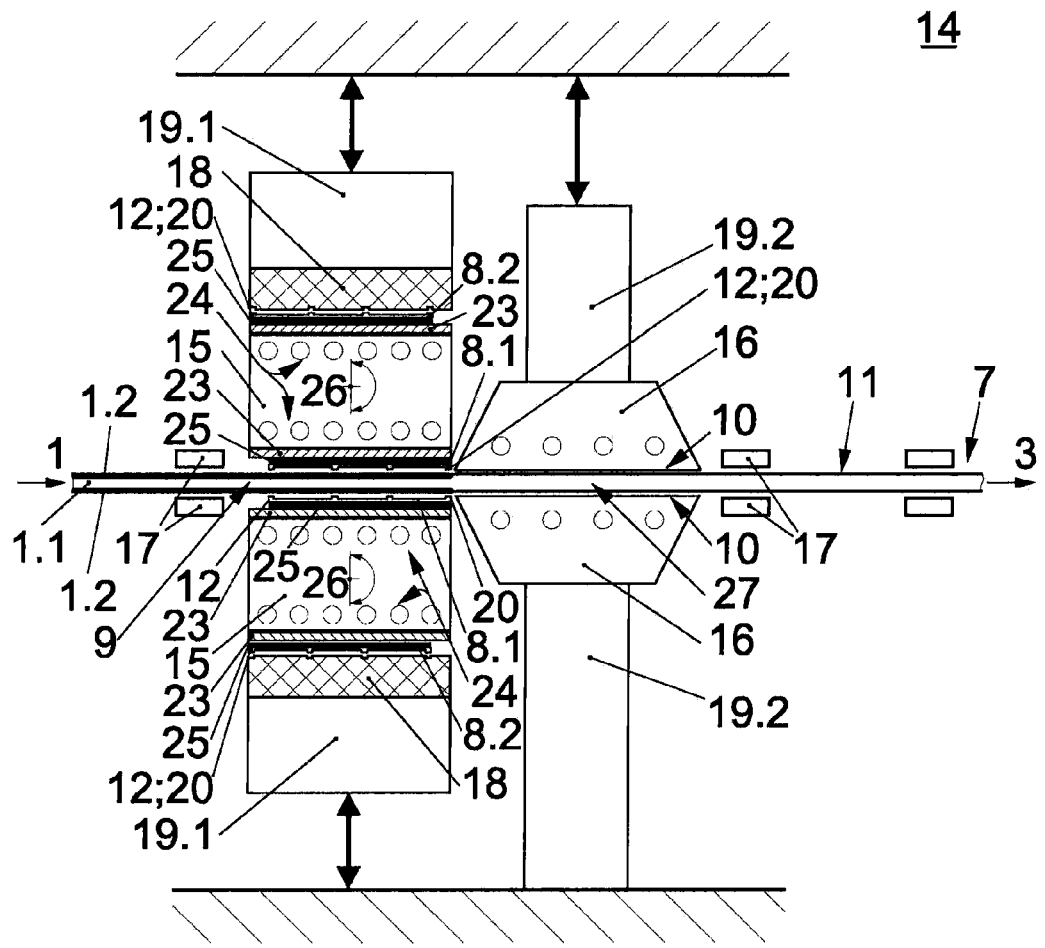
Figure 7:
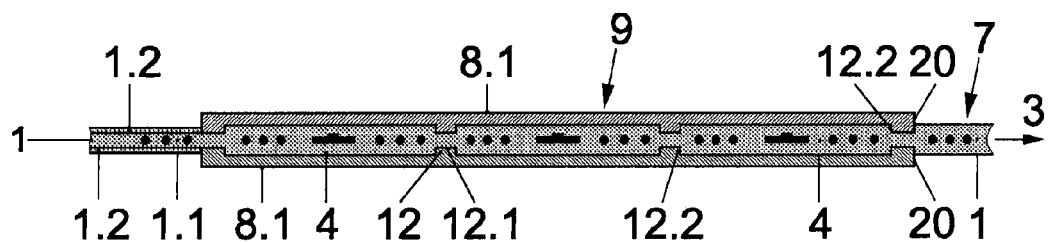

They show:

FIG. 1 a schematic illustration of a film arrangement in plan view,

FIG. 2 a schematic sectional illustration of a device for laminating,

FIG. 3 a schematic sectional illustration of a further embodiment of a device for laminating, FIG. 4 a schematic sectional illustration of a press plate holding block with an indirectly heatable press plate, FIG. 5*a* a schematic sectional illustration of a device for laminating during a cooling of a laminating section, FIG. 5*b* a schematic sectional illustration of a device for laminating during a heating of a laminating section, FIG. 6 a schematic sectional illustration of a further embodiment of a device for laminating, and FIG. 7 a schematic sectional illustration of a press plate.

Equivalent parts are provided with identical reference signs in all figures.

FIG. 1 shows a film-tape-like multi-layer thermoplastic film arrangement 1 which is formed from a thermoplastic film-tape or from a plurality of sheet-like film arrangements consecutively arranged in the manner of a film-tape. The film arrangement 1 illustrated consists for example of a 0.20 mm thick substrate film 1.1 made of polycarbonate (PC) and cover films 1.2, applied on both sides and made of polycarbonate, each with a thickness of 0.05 mm, wherein a width of the cover films 1.2 in the example has a value of 500 mm and the substrate film 1.1 has a width of 550 mm, so that index holes 2 at the edge of the substrate film 1.1 are not overlapped by the cover films 1.2.

In the substrate film 1.1 circuits are introduced in a uniformly shaped lattice, for generating chip-cards or any other desired card-like products. In the example five rows of card-sized, 85 mm long surface portions 4 which are spaced 10 mm apart are arranged transversely to a feed direction 3. A width of the surface portions 4 in the feed direction 3 is equal to 55 mm and the distance between them, i.e. a width of a grid 5, is equal to 5 mm. This means that a lattice step 6 is a length of 60 mm. The film arrangement 1 is guided or processed in a transport plane 7.

Planes of the film arrangement 1 during heating and cooling are identical. A first press plate 8.1 used for a laminating process in its width completely covers the width of the film arrangement 1 with an overhang, and in feed direction 3 a length of the first press plate 8.1 is equal to three lattice steps 6 plus 1 mm. The three lattice steps 6 correspond to one provided laminating section 9.

Viewed from the laminating section 9 outwards, the first press plate 8.1 is placed 0.5 mm outside of a grid center 5.1; when the film arrangement 1 is transported forward by exactly one laminating section 9, in every third grid center 5.1 a 1 mm-wide strip is thereby double-laminated. A cooling surface 10 sits 1 mm away from the first press plate 8.1 on top of the laminated film arrangement 1. The cooling surface 10 in the example also covers the entire width of the film arrangement 1 and in the example is 210 mm long in the feed direction 3. In the already laminated film arrangement region 11, indentations 13 embossed by grid cams 12 are arranged.

Approximately the same situation is shown in FIG. 2 in a side view and in cross-section. FIG. 2 shows a device 14 for laminating the film arrangement 1. First press plates 8.1 arranged on press plate holding blocks 15 and cooling surfaces 10 arranged on cooling blocks 16 are pressed onto the film arrangement 1, whereby the film arrangement 1 is laminated.

To the right and left of the press plate holding blocks 15 and the cooling blocks 16 the film arrangement 1 is held by multiple clamping piece pairs 17, which after moving apart both the press plate holding blocks 15 with the first press plates 8.1 and the cooling blocks 16 with the cooling surfaces 10 by movement in feed direction 3 carry out the transporting of the film arrangement 1 by the intended step of the laminating section 9.

Between the press plate holding block 15 and the first press plate 8.1 a heating plate 18 is arranged, which directly heats the first press plate 8.1 up to a required laminating temperature. Each press plate holding block 15 is mounted onto a first press table 19.1. The first press plates 8.1 are mounted onto the heating plates 18 in such a manner that the press plate holding block 15, heating plate 18 and a press plate edge 20 on a side facing towards the cooling block 16 one above the other in the direction of motion of the first press tables 19.1 form a flush ending, so that the cooling blocks 16 can sit with their cooling surfaces 10 on the previously heated laminating section 9 at a distance of 1 mm from the press plate edge 20. The cooling surfaces 10 therefore fit in the grid 5. The cooling blocks 16 are each attached to a second press table 19.2. Both the first press tables 19.1 and the second press tables 19.2 are moveable, respectively driven, perpendicularly to a surface of the film arrangement 1.

In FIG. 3 the illustration in FIG. 2 has been expanded such that a holding tape supply device 21.1 is arranged before the press plate holding blocks 15 in the feed direction 3 and after the cooling blocks 16 in the feed direction 3 a holding tape discharge device 21.2 is arranged, whereby one holding tape 22.1, 22.2, also referred to as a release tape or release film, can be applied on each surface of the film arrangement 1 and can be withdrawn again after the laminating and cooling. The holding tape 22.1, 22.2 in the example is a 0.025 mm thick polyester film coated with anti-sticking material. When using holding tapes 22.1, 22.2 sheet-like film arrangements 1, placed without gaps onto the lower holding tape 22.1, can be highly advantageously laminated.

An insulating layer 23 is connected to the press plate holding block 15 in FIG. 4, which provides limited thermal insulation of the indirectly heated first press plate 8.1 from an unheated cooling zone 24, water-cooled in the example, in the press plate holding block 15. A thickness of the insulating layer 23, and thus a thermal insulation effect can be chosen as desired. In the example the insulating layer 23 has a thickness of 0.3 mm and consists of a temperature-resistant thermoplastic polyurethane film. The insulating layer 23 also assumes a flatness compensation function with regard to the first press plates 8.1 which press against one another during the laminating process. The first press plates 8.1 in the example consist of hardened steel and are 0.8 mm thick. In the example between the first press plate 8.1 and the insulating layer 23 a 0.3 mm thick copper film is arranged as a storage plate 25. The first press plate 8.1 and the storage plate 25 in the example are indirectly heated up to 190° C. by a separate heating plate 18, which is pressed on.

In FIG. 5a two press plate holding blocks 15 press on cooling blocks 16, which have been moved opposite to the feed direction 3 of the film arrangement 1 to the proper laminating position and in this position cool the heated laminating section 9. The press plate holding blocks 15 are in turn pressed by first press tables 19.1 in the direction of the film arrangement 1. On each of the surfaces of the cooling blocks 16, facing away from the film arrangement 1, a heating plate 18 is mounted, on top of which the first press plates 8.1 of the press plate holding blocks 15 are placed, so that during the cooling of the film arrangement 1 the first press plates 8.1 are indirectly heated.

In the subsequent transport step the press plate holding blocks 15 are lifted up from the heating plates 18 and the cooling blocks 16, closed in the manner of a pair of tongs, move in the feed direction 3 and feed the film arrangement 1 along by one laminating section 9. After this the heated first press plates 8.1 are placed on top of and on both sides of the film arrangement 1 to be heated, as shown in FIG. 5b. A heating period, which is to say a heating phase, in the example is 15 seconds for the material polycarbonate. At the end of the heating and preliminary cooling phase the laminated laminating section 9 already has a temperature of less than 160° C.

A further configuration of a device 14 for laminating, with indirectly heated first press plates 8.1 and second press plates 8.2, is shown in FIG. 6. The press plates 8.1, 8.2 are each mounted on both sides of the cooling zones 24, rotatable by an angle of 180° and cooled by water, of the press plate holding blocks 15, wherein rotational axes 26 lie parallel to the surface of the film arrangement 1 and perpendicular to the feed direction 3.

While the first press plates 8.1 heat up the laminating section 9 and press it together under a predefined laminating pressure, second press plates 8.2 are heated indirectly by the heating plates 18 attached to the first press tables 19.1. Directly next to the first press plates 8.1 and the press plate holding blocks 15, the cooling surfaces 10 fixed to the cooling blocks 16 sit on top of the film arrangement 1, and under a predefined cooling pressure cool the still heated cooling region 27 which is moved along by the feeding motion of the clamping piece pairs 17 by one laminating section 9. The cooling blocks 16 are in turn pressed by means of second press tables 19.2 onto the cooling region 27 to be cooled.

After completion of a laminating and preliminary cooling phase the first press tables 19.1 are lifted from the press plate holding blocks 15 and the press plate holding blocks 15 on the other hand are lifted far enough from the laminating section 9 of the film arrangement 1 so that a rotation of the press plate holding blocks 15 by an angle of 180° is possible. In the meantime the cooling blocks 16 are also lifted somewhat from the film arrangement 1 and the film arrangement 1 is moved along by one laminating section 9. The heated second press plates 8.2 and the cooling blocks 16 with their cooling surfaces 10 then sit on top of the laminating section 9 and the cooling region 27 to be cooled, under additional pressure of all press tables 19.1, 19.2.

FIG. 7 shows an example of a configuration of the press plates 8.1, 8.2 with grid cams 12. The grid cams 12 extend transversely to the feed direction 3 of the film arrangement 1 over the entire width of the press plates 8.1, 8.2. In the example the grid cams 12 have a width 12.1 of 1 mm, the distance from center to center is equal to 60 mm, which corresponds to the length of the lattice step 6. At the beginning and at the end of the length of the press plate 8.1, 8.2 and in each grid 5 a grid cam 12 is arranged. The grid cams 12 engage exactly with the grid centers 5.1 of the film arrangement 1 in the feed direction 3. A height 12.2 of the grid cams 12 is equal to 0.03 mm in the example.

LIST OF REFERENCE SIGNS 1 film arrangement
1.1 substrate film
1.2 covering film
2 index holes
3 feed direction
4 surface portions
5 grid
5.1 grid center
6 lattice step
7 transport plane
8.1, 8.2 press plate
9 laminating section
10 cooling surface
11 laminated film arrangement section
12 grid cams
12.1 width of grid cams
12.2 height of grid cams 13 indentation
14 device for laminating
15 press plate holding block
16 cooling block
17 clamping piece pairs
18 heating plate
19.1, 19.2 press table
20 press plate edge
21.1 holding tape supply device
21.2 holding tape discharge device
22.1, 22.2 holding tape
23 insulating layer
24 cooling zone
25 storage plate
26 rotational axis
27 cooling region

The invention claimed is:

1. A device for laminating a film-tape-like multilayer thermoplastic film arrangement having a width and which is formed from a thermoplastic film-tape or from a plurality of sheet-like film arrangements consecutively arranged in the manner of a film-tape, wherein the film arrangement has surface portions divided into uniform lattice steps at least in the feed direction, said surface portions being separated by means of grids having a grid center, and wherein the lamination takes place under the application of pressure and heating of a laminating section of the film arrangement up to a temperature in the softening region of the thermoplastic and subsequent cooling of the heated laminating section under pressure, said device comprising:
heatable press plates; and
cooling surfaces, wherein a width of said press plates and cooling surfaces is greater than or equal to the width of the film arrangement, wherein the press plates and cooling surfaces are positioned to receive the film arrangement such that press plate edges lie at the grid center and the cooling surfaces are a distance up to 3 mm next to a press plate edge and beginning in the same grid (5), wherein a length of the cooling surfaces is greater than or equal to a length of the press plates, wherein one press plate and one cooling surface are on both sides of the film arrangement;
press plate holding blocks, wherein the press plates are fastened to the press plate holding blocks that can be moved or are supported by first press tables; and
cooling blocks, wherein the cooling surfaces are part of the cooling blocks that can be moved or are supported by second press tables.

2. The device according to claim 1, in which a storage plate is arranged between the press plate holding block and the press plate.

3. The device according to claim 1, in which an insulating layer is arranged between the press plate holding block and the press plate.

4. The device according to claim 1, in which a heating plate is arranged on the cooling block opposite to the cooling surface.

5. The device according to claim 1, in which the cooling blocks can be moved underneath the press plate holding blocks.

6. The device according to claim 1, in which the press plate holding block is mounted so that it can rotate by 180° about a rotational axis parallel to a surface of the film arrangement and perpendicular to the feed direction.

7. The device according to claim 6, in which one press plate is arranged on each opposite side of the press plate holding block.

8. The device according to claim 6, in which heating plates are arranged on the first press tables pressing the press plate holding blocks on a side facing towards the press plate holding blocks.

* * * * *